(12) United States Patent
Brusewitz et al.

(10) Patent No.: US 6,384,862 B1
(45) Date of Patent: May 7, 2002

(54) IMAGING SYSTEM AND METHOD FOR INTERACTIVE CONTROL OF IMAGE QUALITY

(75) Inventors: Harald Brusewitz, Älvsjo; Bo Burman, Väsby; Göran Roth, Stockholm, all of (SE)

(73) Assignee: Telefoaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 08/823,656

(22) Filed: Mar. 12, 1997

(51) Int. Cl.[7] ............................................. H04N 5/232
(52) U.S. Cl. ...................................... 348/212; 348/211
(58) Field of Search .................................. 348/222, 211, 348/207, 143, 13, 15, 14.05, 14.01, 14.03, 14.12

(56) References Cited

U.S. PATENT DOCUMENTS

| | | | | |
|---|---|---|---|---|
| 4,004,084 A | * | 1/1977 | Brown et al. ................... 348/15 |
| 5,229,850 A | * | 7/1993 | Toyoshima .................. 348/143 |
| 5,270,811 A | * | 12/1993 | Ishibashi et al. ............. 348/143 |
| 5,272,527 A | * | 12/1993 | Watanabe .................... 348/154 |
| 5,371,535 A | * | 12/1994 | Takizawa ...................... 348/15 |
| 5,432,871 A | * | 7/1995 | Novik ............................ 348/17 |
| 5,479,206 A | * | 12/1995 | Ueno et al. ................... 348/211 |
| 5,548,346 A | * | 8/1996 | Mimura et al. .............. 348/738 |
| 5,598,456 A | | 1/1997 | Feinberg ....................... 379/42 |
| 5,617,135 A | * | 4/1997 | Noda et al. ................... 348/12 |
| 5,652,849 A | * | 7/1997 | Conway et al. ............. 348/115 |
| 5,831,666 A | * | 11/1998 | Palmer et al. ................. 348/15 |
| 5,850,472 A | * | 12/1998 | Alston et al. ................ 382/162 |
| 5,880,728 A | * | 3/1999 | Yamaashi et al. ............ 348/384 |
| 5,896,128 A | * | 4/1999 | Boyer .......................... 348/15 |
| 5,926,209 A | * | 7/1999 | Glatt ........................... 348/143 |
| 6,084,631 A | * | 7/2000 | Tonkin et al. ............... 348/211 |

FOREIGN PATENT DOCUMENTS

WO      WO 94/03014      7/1992

* cited by examiner

Primary Examiner—Wendy R. Garber
Assistant Examiner—Aung S. Moe
(74) Attorney, Agent, or Firm—Jenkens & Gilchrist, P.C.

(57) ABSTRACT

An improved imaging system and method for providing increased viewer control over the operating parameters of the imaging system is described. Viewer control is facilitated by including a backchannel within the imaging system, whereby a viewer may adjust spatial and temporal resolution, quantization and other operating parameters of the video transmission.

26 Claims, 2 Drawing Sheets

IMAGING SYSTEM AND METHOD FOR INTERACTIVE CONTROL OF IMAGE QUALITY

BACKGROUND OF THE PRESENT INVENTION

1. Field of the Invention

The present invention relates generally to an electronic imaging system and method, particularly, to an improved imaging system and method for customizing the images to the viewer's specifications, and, more particularly, to an imaging system and method allowing the viewer, via a backchannel, to adjust the spatial and temporal resolution and quantization parameters of an image.

2. Background and Objects of the Present Invention

With the rise of the consumer electronics industry over the past few decades, a variety of electronic imaging systems of increasing complexity have emerged, e.g., video recorders, camcorders and the like. Additionally, video teleconferencing communications are becoming increasingly important as our society becomes increasingly and interactively interconnected.

As is understood in this art, video, i.e., moving, images undergo encoding to reduce the amount of information needed to represent a given image. Encoding affects both the spatial resolution, i.e., the detail within a particular image frame, and temporal resolution, i.e., the number of such image frames per second. These parameters are typically fixed within a conventional video system, such as the one shown in FIG. 1 of the Drawings and generally referred to herein as numeral 10. The video system 10 in the figure includes a sending device 12 which receives signals from a camera 14. It should be understood that various portions of camera 14 which are not related to the present invention, for example, the diaphragm, shutter and the like, are not illustrated. Accordingly, as is understood in this art, the optical image before the camera 14, such as the individual depicted, is received by a camera lens 16 and converted into an analog video signal, e.g., by a conventional charge coupled device. It should be understood that camera 14 may be a digital camera forwarding digital data to a subsampler device 18 within the sending device 12. If camera 14 is not digital, however, and analog-to-digital conversion is required, then device 18 may also function as an A/D converter, as is understood in the art. The subsampler 18 determines pixel values representing the captured video image at a particular spatial resolution, i.e., pixels per line and lines per image, and temporal resolution, i.e., images per second. Another parameter related to both spatial and temporal resolution is quantization, i.e., a measure of the amount of distortion present in the video signal, as will be discussed in more detail hereinafter.

An encoder 20 encodes the aforedescribed digital image data into a video signal stream which flows into a buffer 22. As is understood in the art and discussed further herein, the rate of the flow of information from the encoder 20 into buffer 22 varies in accordance with the degree of encoding. Additionally, the video signal stream typically includes compressed signals, in which image information has been condensed or compressed by the encoder 20 to facilitate transmission or storage. One set of formats using such compression technologies are those specified by the Moving Picture Experts Group (MPEG), a standard in accord with the International Organization for Standardization/ International Electro-technical Commission (ISO/IEC). Other compression technologies are the H.261, H.262 and H.263 standards of the International Telecommunications Union, Teleconferencing Section (ITU-T) for use in video teleconferencing, for example.

In conjunction with these image data formatting standards and techniques, by which the encoder 20 provides a syntax for the subsequent bitstream, the encoder 20 also employs compression algorithms, such as Discrete Cosine Transforms (DCT), Huffman coding and other mechanisms, whereby the amount of data needed to represent the image is drastically reduced while substantially retaining image integrity. As is well understood by those skilled in the art, these and other techniques eliminate or reduce the transmission of frame-to-frame redundancies and other information which are unnecessary or repetitive, and exploit various physiological and psychological aspects of human perception to present a coherent image to the viewer's eye.

With further reference to FIG. 1, the subsampler 18, encoder 20 and buffer 22 are controlled by a control unit 24, which also controls other functions of the imaging system 10. For example, control unit 24 controls the sequencing of the afore-described operations, i.e., image pickup by camera 14 through a connection thereto (not shown), pixel conversion in subsampler 18, compression in encoder 20, recording the encoded images on a magnetic or electronic recording medium (not shown), and other operations. Control unit 24 supplies encoder 20 with a plurality of operating parameters to govern the aforementioned transformation of pixel data into a corresponding compressed bitstream. As discussed, control unit 24 also governs the variable bit rate of the information flow into buffer 22 to maintain a particular data level and avoid both overflow and underflow therein.

As is understood in this art, the primary purpose of buffer 22 is to regulate the flow of data from the encoder 20 and forward that data at a fixed rate across a transmission channel 26 to a receiver device 28, particularly, to another buffer 30 therein, which like buffer 22 acts as a reservoir storing the data and regulating its use. It should, of course, be understood that channel 26 may transfer data at a variable rate, e.g., a variable rate service of an Asynchronous Transfer Mode (ATM) network. Nonetheless, the variable flow rate of data from encoder 20 does not generally agree with that of channel 26, fixed or variable.

Buffer 30 forwards the received image data, at a fixed or variable rate as needed, to a decoder 32. Similarly to the encoding process, the decoder 32 reverses the afore-described compression algorithms to expand the image pursuant to the aforementioned operating parameters. In other words, the decoder 32 decompresses the compressed information in the bit stream and reconstitutes the image pursuant to the relevant image format used, e.g., the ITU-R/601 Digital Studio Standard, and the operating parameters. The reconstituted image is then placed within an image storage device 34, the contents of which may be continuously displayed on a video display 36, the circuitry of which is understood in the art.

As discussed, the aforedescribed compression technologies employ various techniques to condense the image information. The decoder 32 is configured to interpret the format and operating parameters by which the image information was encoded by encoder 20. As is understood in the art, much of the decoding process performed within the decoder 32 may be called "normative", i.e., fixed by the particular standard used, e.g., MPEG. Consequently, the decoder 32 readily recognizes these normative parts of a signal from encoder 20, i.e., how to interpret the transmitted bits in the bit stream.

In conventional apparatus employing the above technology, the aforementioned operating parameters are fixed within the video system 10. Usually, encoder 20 utilizes fixed spatial and temporal resolution values, which comports well with the requirements of buffer 22, guaranteeing a fixed-rate bitstream across transmission channel 26. Nonetheless, buffer 22 in an effort to maintain the transmission rate required by the channel 26 adjusts the quantization or distortion of the pertinent images. Quantization then becomes a function of the fullness of buffer 22, which, in turn, is a function of the complexity of the subject video images, i.e., how bit-consuming the images are during compression. Some encoders 20 have fixed spatial resolution only and the buffer 22 adjusts quantization and temporal resolution to maintain the constant bit-rate. The balance between quantization and temporal resolution is governed by a buffer regulation algorithm, as is understood in the art.

One problem with the above configuration, however, is that the aforementioned operating parameters may be unsuitable in certain circumstances, and the buffer regulation algorithm or other resolution balancing scheme may require adjustment to suit the needs of the human viewer who may have a different spatial/temporal resolution and distortion balance in mind. For example, some video applications may require higher temporal resolution at the cost of coarse quantization, e.g., video communication between deaf people (sign language) who prefer high temporal resolution. Additionally, surveillance applications normally require higher spatial resolution and fine quantization at the cost of temporal resolution.

Further, with the growing rise of consumer use and proficiency in electronic imaging systems, sophisticated videographers want increasing control over the operating parameters and may make fine adjustments to the balance between spatial and temporal resolution and quantization for a multitude of other applications, fine tuning these parameters for objective or subjective effect.

With these operating parameters fixed, however, videographers or any other user of video apparatus having these immutable characteristics cannot make any adjustments to the apparatus and encoder 20 operates without any feedback from the viewer.

Accordingly, it is a first object of the present invention to provide the viewer with a means to adjust the aforementioned spatial and temporal resolutions and quantization variables to suit their individual needs.

It is more particular object of the present invention to provide a means of feedback from the viewer to the encoder, enabling the viewer to have increased flexibility over the aforementioned operating parameters.

SUMMARY OF THE INVENTION

The present invention is directed to an improvement in an imaging system and method for providing increased viewer control over the operating parameters of the imaging system. Viewer control is facilitated by including a backchannel within the imaging system, enabling the viewer to adjust the operating parameters, e.g., spatial and temporal resolution, and quantization, of the video transmission.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
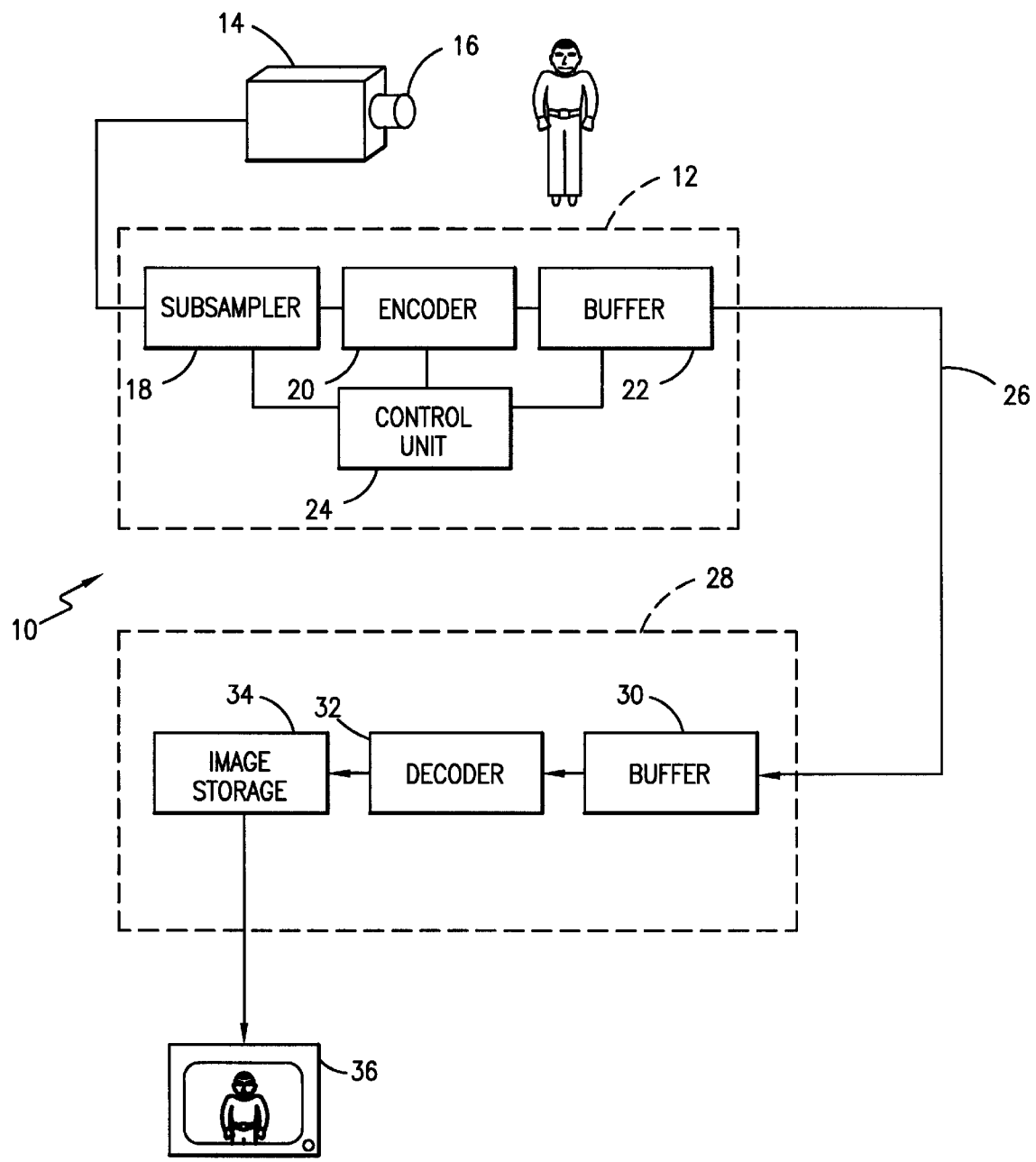
FIG. 1 is a block diagram illustrating a conventional electronic imaging system.
Figure 2:
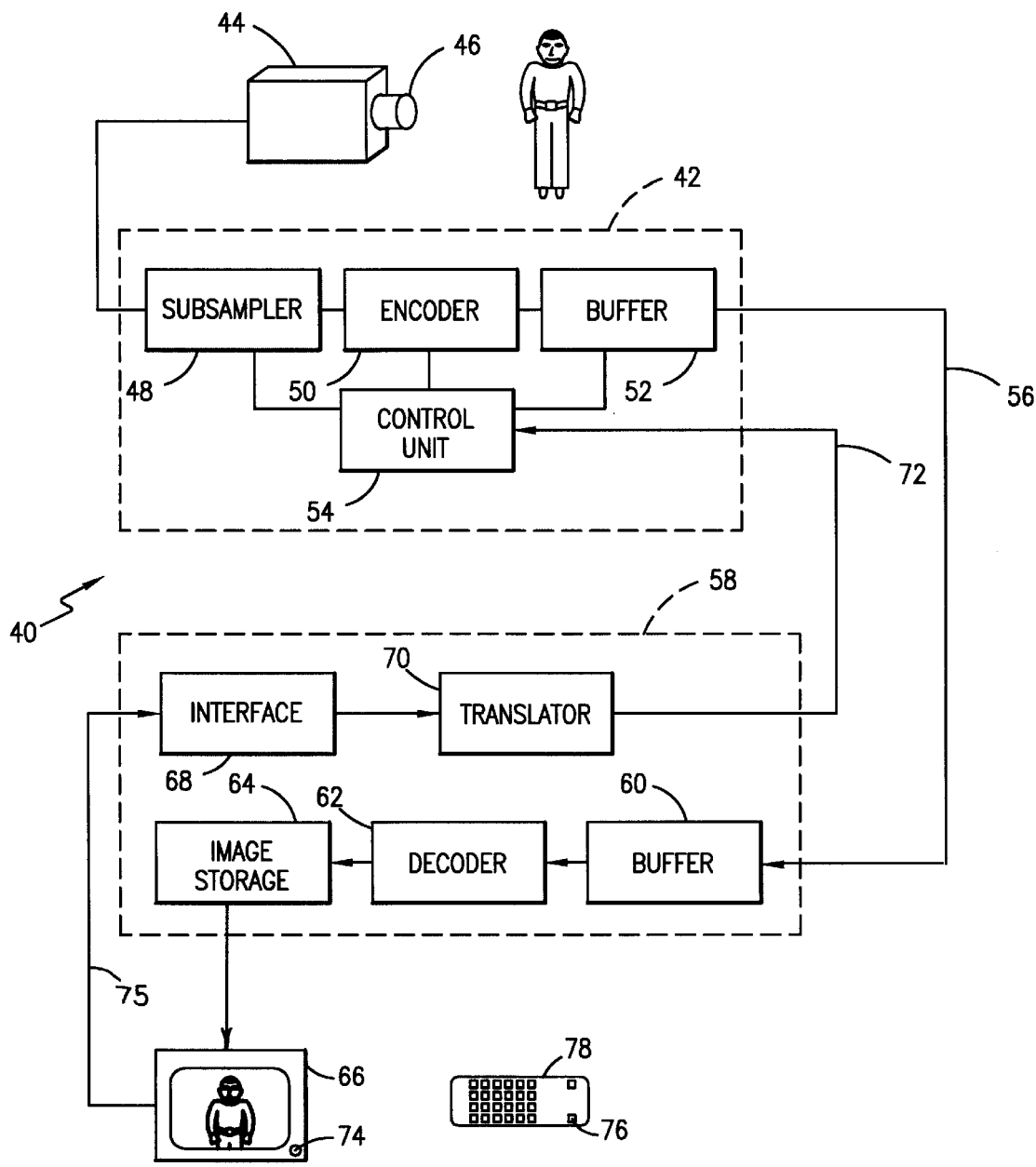
FIG. 2 is a block diagram illustrating an electronic imaging system in accordance with the present invention.

With reference now to FIG. 2 of the drawings, there is illustrated an electronic imaging system, generally represented by the numeral 40, which incorporates the subject matter of the present invention. The imaging system 40 illustrated in FIG. 2, as with the conventional imaging system 10 set forth in FIG. 1, includes a sending device 42 which receives signals from a camera 44 which captures and records an optical image, such as the individual depicted. As discussed, the various portions of camera 44 that are not related to the present invention, are not illustrated. The optical image before camera 44 is received by a camera lens 46 and converted into a signal, as described. The aforementioned signal is then forwarded to a subsampler device 48, which determines pixel values representing the captured video image at a particular spatial resolution, i.e., pixels per line and lines per image, and temporal resolution, i.e., images per second. As discussed in connection with the imaging system 10 of FIG. 1, an encoder 50 encodes the aforedescribed digital data into a video signal stream at particular spatial and temporal resolutions, which are fixed in conventional systems.

As with the sending device 12 of the conventional imaging system 10, sending device 42 includes a buffer 52 to receive the encoded, compressed video signal stream from the encoder 50, and a control unit 54 to control the operations of the converter 48, encoder 50 and buffer 52. As discussed, the control unit 54 supplies encoder 50 with the aforedescribed operating parameters to govern the data transformation. Whereas several parameters were fixed in the conventional system illustrated in FIG. 1, e.g., the aforementioned spatial and temporal resolutions, a user of the video system 40 of the present invention is able to variably control these parameters, as will be discussed more fully hereinafter.

As with the conventional system, buffer 52 manages the variable flow of data from the encoder 50 and outputs a fixed-rate video data bit stream across a transmission channel 56 to a receiver device 58, particularly, to a buffer 60 therein, which like buffer 30 in FIG. 1 receives the fixed flow of data and forwards it to a decoder 62. As with channel 26, it should be understood that channel 56 may permit variable data flow rates.

Similarly to the encoding process, the decoder 62 reverses the aforedescribed compression algorithms to expand the image pursuant to the aforementioned operating parameters. Decoder 62 decompresses the compressed and formatted information in the bit stream and reconstitutes the image pursuant to the relevant format and the operating parameters. The reconstituted image is then placed within an image storage device 64, the contents of which may be continuously displayed on a video display 66, which in FIG. 2 displays the aforementioned individual.

As discussed, decoder 62 is configured to decode normative information from the encoder 50, i.e., the format, standard and operating parameters of the video data bitstream. It should, therefore, be understood that the decoder 62, as well as decoder 32, recognizes these normative parts of a signal from encoder 50, e.g., the particular video format used, e.g., the aforementioned ITU-R/601 standard, and the various compression standards, e.g., ISO/IEC MPEG-1, MPEG-2, and MPEG-4, and ITU-T H.261, H.262 and H.263. Although decoder 62 is preferably of conventional design and therefore able to understand the pertinent normative communication signals, it should be understood that decoder 62 may also be configured to accept non-normative commands, i.e., commands or information outside the particular standard being used, as described hereinafter.

Since the encoder 50 (and the encoding process) is not specified within the aforementioned standards (all that matters is correct decoding), video system designers have a lot of freedom as to the implementation non-normative aspects of the technology. So long as the decoder 62 can understand the pertinent standards and is configured to decode the particular non-normative functions desired, numerous additional options may be implemented, such as in modifying picture quality, as will be discussed more fully hereinafter.

With reference again to FIG. 2, receiving device 58 also includes a human interface device 68, through which many of the aforedescribed operating parameters may be adjusted, e.g., to modify image clarity (spatial resolution and quantization), frequency (temporal resolution or frame rate) and other characteristics. The human interface device 68, which may include a button, slide, keyboard or other conventional interface apparatus, forwards the indicated changes to a translator 70, which converts the changes to a signal. The aforedescribed signal is then sent back to the control unit 54 of the sending device 42 via a backchannel 72.

By means of the video system 40 configuration with backchannel 72 signaling capability, the viewer may through interface 68 interactively modify various operational parameters, such as those defining image quality. For example, the following operational parameters may be implemented in the video system 40 of the present invention to regulate image quality:

(a) high/low spatial resolution (image detail),
(b) high/low temporal resolution (frame rate),
(c) high/low quantization (image distortion),
(d) balance between (a) and (b),
(e) balance between (a) and (c), and
(f) balance between (b) and (c).

It should be understood that, whereas the conventional video system 10 employs fixed (a), (b) and (c) operational parameters, the video system 40 of the present invention permits alteration of the balance between these operational parameters. In the conventional video system 10, if either (a) or (b) were changed, then the amount of distortion (c) must be adjusted to achieve the requisite bit rate. Accordingly, selecting (a) is equivalent to selecting (e), a balance between spatial resolution and quantization. Similarly, selecting (b) is equivalent to selecting (f), a balance between temporal resolution and quantization. It should also be understood that selecting (c) is also equivalent to selecting (f) since an encoder typically does not alter its spatial resolution but may easily adjust temporal resolution.

As discussed, the viewer may want a different image resolution balance than that presently in use, i.e., either the aforementioned predetermined balance or a previously selected balance, and want to adjust the operational parameter settings to achieve a desired balance. Through interaction with the human interface 68, e.g., by pressing or turning a button 74 (constituting interface 68 or connected thereto via a connection 75) on the display device 74 or a like button 76 on a remote device 78 also shown in FIG. 2, the translator 70 may forward a particular codeword or other indicia indicating the particular command corresponding thereto back to the encoder 50, which adjusts its operations accordingly. For example, the viewer may forward the commands "A+" to increase spatial resolution, "B−" to decrease temporal resolution, "F+" to decrease distortion, etc. It should, of course, be understood that the above commands are exemplary only, and other symbols may be utilized by the video system 40 to implement the viewer's desired changes. In any event, the bitstream after adjustment should reflect the indicated change.

Additionally, a request for a new balance between temporal resolution and coding distortion may be sent from translator 70 via backchannel 72 as "q<k>", where "q" represents the type of command requested and "<k>" indicates a particular value for that command. It should be understood that "k" is preferably within a predefined discrete range of permissible values. Since the number of permissible resolutions is rather large in the aforementioned compression standards, e.g., MPEG-1, MPEG-2, ITU-T H.261 and others, the range of resolutions in a specific implementation is preferably specified and is governed by the capabilities of the particular camera (14 or 44) and subsampler (18 or 48) used. Alternatively, it may be useful to limit the numbers of such resolutions to a small set, assigning each a unique code. Temporal resolution may likewise be designated within a discrete range of values, albeit there may be constraints to multiples of the minimum frame period, e.g., 1/30th of a second. Quantization, typically within the purview of the equipment manufacturers, may likewise be selected within a range, e.g., supplied by the particular manufacturer. In this manner, it should further be understood that the encoder 50, upon receipt of a given codeword such as "q", may set a plurality of internal parameters accordingly. Similarly, various internal parameters of buffer 52 may also be set.

Further, the particular viewer request transmitted through the backchannel 72 may be defined to be valid in a number of different ways, including:

(A) forever, until a new request is given;
(B) for a limited time period, namely x seconds, where x is pre-defined;
(C) for a limited number of n images, where n is pre-defined;
(D) as long as a transmitted codeword "x" indicates; and
(E) as many images as a transmitted codeword "n" indicates.

For example, a user may request a very high spatial resolution image, which may constitute a high resolution still image, by pressing button 74 (or button 76 on remote 78), which causes the translator 70 to generate a specific codeword, e.g., "s" for still, which would be defined to be valid for a single image (n=1 for option C above). The entire command transmitted across backchannel 72 would then be "sC1". Also, "g3A" may indicate a quantization level 3 from now on, and "t1B5" would similarly be temporal resolution level 1 for 5 seconds.

In view of the above description, it should be understood that a wide variety of non-normative commands may be utilized by a viewer to customize video images for various usages.

Further details of the still picture management aspects of the video system 40 configuration of the present invention may be found in Applicants' co-pending patent application, entitled "Method and Apparatus for Still Picture Transmission and Display", filed concurrently herewith and incorporated herein by reference.

It should be understood that the aforedescribed principles of the present invention may also be applied in other contexts, such as video conferencing, whereby a viewer may adapt the received signal to suit their needs. For example, if identification of individuals or objects is important, then an increase in spatial resolution and finer quantization (less distortion) is in order at the expense of temporal resolution. If image continuity is important, then sacrifices may be made in spatial resolution and distortion to achieve temporal stability. Other variations, such as taking a still image of a remote participant or fine-tuning the received image for further applications, should be considered to be within the purview of the present description.

It should be understood that sending device 42 may be resident within camera 44 and receiving device 58 may be resident within the display device 66, such as in conventional video systems. It should, nonetheless, be understood that both the sending 42 and receiving 58 devices may instead be incorporated within multifunction terminals, e.g., as a video-capable mobile transmitter/receiver, implemented in software (with the requisite hardware components such as the interface 68) within a general computer, implemented as separate equipment boxes with input and output connectors, or included (at least at the receiving end) as part of a value-added-service network, i.e., a network shared resource.

It should further be understood that control unit 54 shown in FIG. 2 may also control operations of the camera 44 through a connection thereto (not shown). In this manner, the camera zoom, pan, tilt, iris and other camera functions may be user controlled because of backchannel 72.

The previous description is of preferred embodiments for implementing the invention, and the scope of the invention should not necessarily be limited by this description. The scope of the present invention is instead defined by the following claims.

What is claimed is:

1. An imaging system for interactively adjusting image quality parameters associated with an image transmission, said imaging system comprising:
   a sending device for receiving a plurality of images from said image transmission and for transmitting said plurality of images;
   a receiver device, connected to said sending device, for receiving said plurality of images transmitted from said sending device, said plurality of images being transmitted from said sending device to said receiver device along a forward channel, said plurality of images transmitted to said receiver device including a plurality of said image quality parameters associated with said plurality of images; and
   an interface, connected to said receiver device, for receiving a non-normative command to modify at least one of said plurality of image quality parameters, said non-normative command being forwarded by said interface to said sending device along a backchannel thereto, whereby a viewer of a display device, connected to said receiver device, interactively adjusts said at least one image quality parameter of subsequent images via said non-normative command input to said interface, wherein a measurement parameter is associated with said non-normative command for defining a valid duration during which said non-normative command is operable to adjust said at least one image quality parameter.

2. The imaging system according to claim 1, wherein said sending device generates a digital signal corresponding to said plurality of images and forwards said digital signal to said receiver device, and wherein said receiver device converts said digital signal to the plurality of images for display.

3. The imaging system according to claim 1, wherein said sending device comprises encoding means therein for encoding said plurality of images into a corresponding encoded signal, and wherein said receiver device comprises decoding means therein for decoding said encoded signal into said plurality of images for display.

4. The imaging system according to claim 3, wherein said sending device further comprises a sending buffer, connected to said encoding means, for buffering the encoded signal received from said encoding means, and wherein said receiver device comprises a receiver buffer, connected to said sending buffer and said decoding means, for buffering the encoded signal entering said decoding means.

5. The imaging system according to claim 4, wherein said sending device further comprises a control unit for controlling the operation of said encoding means and said sending buffer, said control unit receiving said non-normative command from said interface across said backchannel.

6. The imaging system according to claim 1, wherein said receiver device comprises a translator means for converting said non-normative command into a control signal and for transmitting said control signal across said backchannel to a control unit within said sending device.

7. The imaging system according to claim 1, wherein said image quality parameters are selected from the group consisting of: high/low spatial resolution, high/low temporal resolution, high/low quantization and combinations thereof.

8. The imaging system according to claim 1, wherein the interface is selected from the group consisting of a button, slide, keyboard, remote device and combinations thereof.

9. In an imaging system, a method for interactively adjusting image quality parameters associated with an image transmission within said imaging system, said method comprising the steps of:
   receiving a plurality of images from said image transmission in a sending device;
   transmitting said plurality of images from said sending device to a receiver device, said transmission including therein a plurality of said image quality parameters associated with said plurality of images;
   receiving a non-normative command from said receiver device to adjust at least one of said plurality of image quality parameters, said non-normative command having a measurement parameter associated therewith for defining a valid duration during which said non-normative command is operable to adjust said at least one image quality parameter;
   receiving at least one image quality parameter associated with the non-normative command to adjust at least one image quality parameter setting, the at least one image quality parameter operable to adjust balance between the respective associated plurality of said image quality parameters;
   adjusting at least one image quality parameter setting; and
   adjusting at least one respective associated plurality of said image quality parameters prior to said transmission via a backchannel communication from said receiver device to said sending device if said non-normative command is within said valid duration, whereby image transmissions to a display device, connected to said receiver device, subsequent to said adjustment incorporate said adjusted image quality parameters.

10. The method according to claim 9, wherein said sending device in said step of transmitting transmits a digital signal corresponding to said plurality of images to said receiver device, and wherein said receiver device converts said digital signal to the corresponding images for display.

11. The method according to claim 11, further comprising, after said step of receiving and before said step of transmitting, the step of:

encoding, within said sending device, said plurality of images into a corresponding encoded signal.

12. The method according to claim 11, wherein said step of encoding further comprises the step of buffering said encoded signal.

13. The method according to claim 11, further comprising, after said step of transmitting and before said step of adjusting, the step of:

decoding, within said receiver device, said encoded signal into the corresponding plurality of images.

14. The method according to claim 13, wherein said step of decoding further comprises the step of buffering said encoded signal received from said sending device.

15. The method according to claim 9, wherein said step of adjusting comprises translating said backchannel communication from said receiver device into a control signal and transmitting said control signal across said backchannel to said control unit.

16. The method according to claim 9, wherein said adjusting of said at least one of said image quality parameters is made by a viewer of said display device at an interface thereof.

17. The method according to claim 9, wherein said image quality parameters are selected from the group consisting of: high/low spatial resolution, high/low temporal resolution, high/low quantization and combinations thereof.

18. The method according to claim 9, wherein said step of adjusting said image quality parameters is performed by a viewer manipulating an interface device, said interface device being selected from the group consisting of a button, slide, keyboard, remote device and combinations thereof.

19. The method according to claim 9, wherein the at least one parameter associated with the respective non-normative command to adjust at least one image quality parameter setting includes at least one of the following: a respective codeword or other associated indicia.

20. The method according to claim 9, wherein adjusting non-normative balance includes adjusting at least one of the following: a predefined balance or previously selected balance.

21. A method for increased viewer control, in an imaging system, over image quality parameters associated with an image transmission within the imaging system, the viewer control being facilitated through an interface coupled to a control unit, the method comprising the steps of:

receiving a non-normative command to interactively adjust at least one of the image quality parameters of a subsequent image;

receiving at least one measurement parameter associated with the non-normative command to adjust the at least one of the image quality parameters, the at least one measurement parameter operable to adjust said at least one image quality parameter for a finite duration specified by a user;

adjusting the at least one image quality parameter for the finite duration; and transmitting an image having the adjusted at least one image quality parameter for said finite duration.

22. The method according to claim 21, wherein the finite duration is until a further command is received.

23. The method according to claim 21, wherein the finite duration comprises a predefined limited time period.

24. The method according to claim 21, wherein the finite duration comprises a predefined limited number of images.

25. The method according to claim 21, wherein the image quality parameters are selected from a group consisting of high/low spatial resolution, high/low temporal resolution, high/low quantization and combinations thereof.

26. The method according to claim 21, wherein the interface includes at least one of the following: a button, slide, keyboard, remote device and combinations thereof.

* * * * *